United States Patent [19]

Christoff

[11] Patent Number: 4,931,120
[45] Date of Patent: Jun. 5, 1990

[54] METHOD OF TAPERING END OF CAPILLARY TUBE BORE FOR OPTIC FIBER COUPLING

[75] Inventor: William R. Christoff, Elmira, N.Y.

[73] Assignee: Corning Incorporated, Corning, N.Y.

[21] Appl. No.: 292,550

[22] Filed: Dec. 27, 1988

[51] Int. Cl.$^5$ .......................... G02B 6/38; B65H 69/02
[52] U.S. Cl. ..................................... 156/153; 51/319; 51/326; 65/4.2; 156/158; 156/296; 350/96.21
[58] Field of Search ................. 65/4.2, 61; 350/96.21; 51/319, 281 P, 410, 326; 156/153, 296, 158

[56] References Cited

U.S. PATENT DOCUMENTS

| | | | |
|---|---|---|---|
| 3,801,293 | 4/1974 | Kiser | 51/326 |
| 3,810,802 | 5/1974 | Buhite et al. | 156/296 X |
| 3,944,328 | 3/1976 | Kent | 350/96.21 |
| 4,369,605 | 1/1983 | Opersteny et al. | 51/319 |
| 4,763,970 | 8/1988 | Berkey | 350/96.21 |
| 4,767,430 | 8/1988 | Deneka et al. | 65/4.2 |
| 4,807,959 | 2/1989 | Berkey | 350/96.21 |
| 4,822,389 | 4/1989 | Berkey | 65/2 |

FOREIGN PATENT DOCUMENTS 83932 11/1957 Denmark ............................ 51/326

OTHER PUBLICATIONS

Ingulli, Charles N., "Abrasive Jet Machining", *The Tool and Manufacturing Engineer,* Nov. 1967, pp. 28–33.

Primary Examiner—Michael W. Ball
Assistant Examiner—Jeff H. Aftergut
Attorney, Agent, or Firm—William J. Simmons, Jr.

[57] ABSTRACT

A device for connecting optical fibers is formed by inserting one or more fibers into at least one end of a capillary tube. The bore is tapered to facilitate fiber insertion. To taper the end of a bore, the tube is rotated about its longitudinal axis while a first narrow stream of abrasive particles is directed onto the tube end. The axis of the first stream is located off the axis of the tube bore, thereby forming a taper that is spherical rather than conical. A second stream, the axis of which is coaxial with the bore, is then directed onto the tube end to remove that portion of the tapered aperture adjacent the bore, thereby forming a more funnel-shaped aperture.

13 Claims, 2 Drawing Sheets

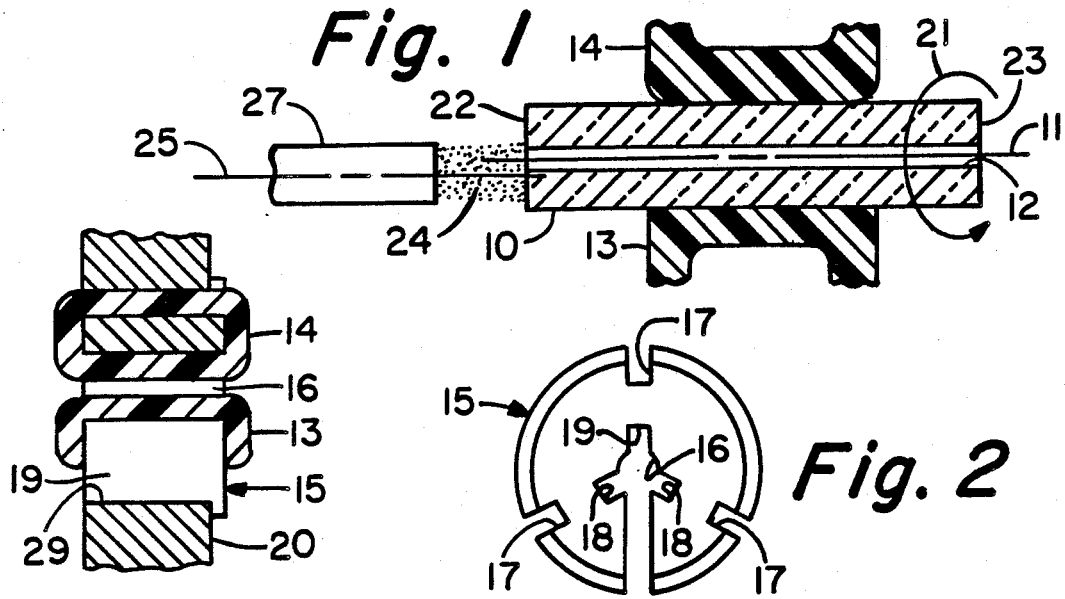
Fig. 1
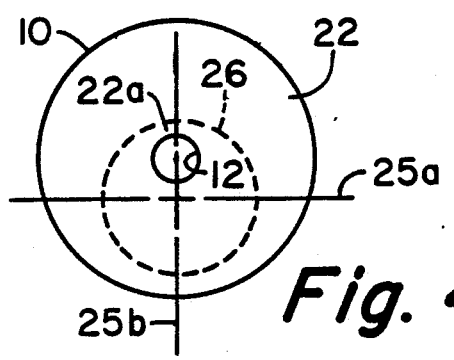
Fig. 3
Fig. 2
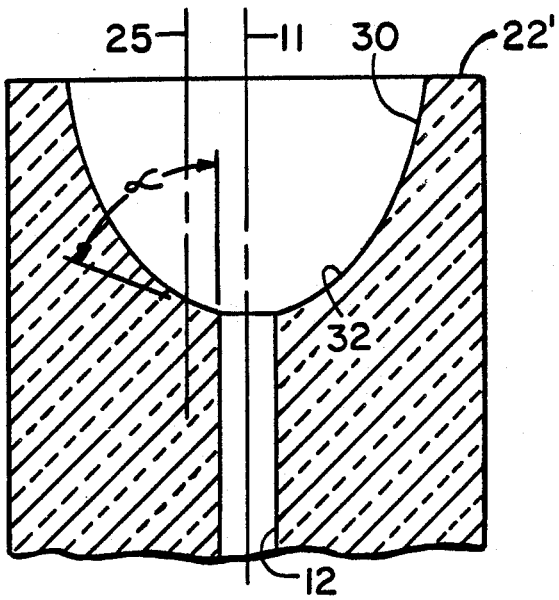
Fig. 5
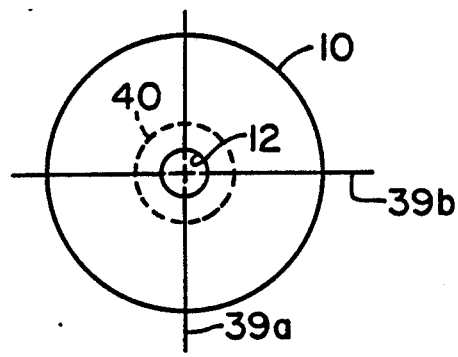
Fig. 4
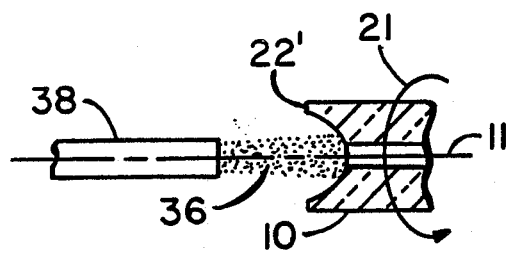
Fig. 7
Fig. 6

METHOD OF TAPERING END OF CAPILLARY TUBE BORE FOR OPTIC FIBER COUPLING

BACKGROUND OF THE INVENTION

The present invention relates to a method of making funnel-like tapered apertures at the ends of a capillary tube bore, and more particularly, to a method of making capillary tube splices and couplers for optical fibers.

Optical fibers have a core surrounded by a cladding having a refractive index lower than that of the core. Optical fiber systems employ various types of optical energy transfer devices that connect or couple energy between such fibers. As used herein, the term "optical energy transfer device" refers to devices for coupling energy between fibers that are disposed in orientations such as end-to-end, side-by-side, and the like.

The end-to-end connection of two optical fibers requires precise axial alignment of the fibers to minimize insertion loss. Due to the relatively large core size of multimode fibers, axial alignment of the cores of such fibers has been accomplished without too much difficulty. However, it is very difficult to axially align the cores of single-mode fibers the core diameters of which are typically 7 to 12 microns.

The technique usually employed for connecting two fibers in end-to-end axial alignment requires a precision centering device such as a connector ferrule or a lead-in ferrule for aligning the adjacent endfaces of the two fibers. Such centering devices may consist of capillary tubes formed of glass, ceramic, gemstone, metal, plastic or the like. To be suitable for the alignment of single-mode fibers, the capillary tube must have a precision bore that is no more than a few microns larger in diameter than the fibers that are to be aligned. In one type of centering device, each fiber extends through the bore of a ferrule such that its endface is flush with the ferrule endface; alignment of the two ferrules bring the fibers into axial alignment. Another type of centering device requires the partial insertion of one fiber into a ferrule bore where it abuts the fiber to which it is to be connected. Since the ferrule bores are only slightly larger in diameter than an optical fiber, they have been provided with enlarged, tapered apertures to facilitate insertion of the fibers.

Another type of coupler relies on the evanescent coupling of optical energy between fibers. A preliminary step in the formation of one coupler of this type requires that two or more optical fibers be inserted into a coupler tube having a bore that is preferably just large enough to accommodate the fibers in side-by-side relationship. The tube is collapsed onto the fibers, and the tube midsection is stretched to reduce the diameters of the fiber cores and to reduce the spacing between the cores. A tight fit between fibers and tube during the preliminary assembly step keeps the fibers in proper alignment during subsequent processing steps. A tapered apertures at the end of the tube bore also facilitates the manufacture of this type of coupler.

Various techniques have been used to form the tapered apertures, depending on the type of material used. Glass, which is a particularly suitable ferrule material, is not easily molded or machined to form apertures having tapered end portions. An attempt to have tapered apertures formed by machining with diamond tools resulted in ferrules which were unacceptable in that the tapered apertures were spherically-shaped, i.e. the angle at which the tapered aperture intersected the bore was so great that the aperture did not properly guide a fiber into the bore.

A method of forming a glass fiber alignment ferrule having enlarged, tapered end portions is disclosed in U.S. patent application S.N. 82,680 filed Aug. 7, 1987 (Berkey 9), now U.S. Pat. No. 4,822,389. A precision glass capillary tube is formed by depositing glass particulate material on a cylindrical mandrel, removing the mandrel, consolidating the resultant cylindrical porous preform and drawing it to reduce the aperture diameter to a size that is slightly larger than the diameter of the optical fibers that are to be connected therein. One end of the resultant tube is attached to a source of air pressure, and a flame is directed onto the tube at spaced intervals while the tube is rotated. A bubble is formed at each region of the tube softened by the flame. The tube is scored and severed at the center of each bubble to produce a capillary tube having tapered apertures at each end thereof. Because of the gradual taper of the enlarged aperture end portions, a fiber that is inserted into the end portion is guided by the tapered wall to the central aperture. However, some fiber connectors require the use of sleeves into which the capillary tube must snuggly fit. Forming a tapered aperture end portion by blowing a bubble may also cause the outside diameter of the glass capillary tube to become enlarged so that it does not fit into the sleeve. Grinding the excess glass from the tube surface to provide a uniform diameter throughout its length is a costly step.

SUMMARY OF THE INVENTION

It is therefore an object of the present invention to provide an improved method of forming an enlarged tapered aperture at the end of a capillary tube. A further object is to provide a method that will overcome the heretofore noted disadvantages of prior art methods. Another object is to provide an improved method of forming an optical fiber splice or connection.

Briefly, the present invention relates to a method of forming a tapered aperture at the end of a bore that extends longitudinally through a capillary tube. A first stream of abrasive particles is directed toward a first end of the tube near the intersection of the bore with that end. The step of directing is continued for a sufficient length of time to remove particles of the tube, thereby enlarging that portion of the bore that intersects the first end.

The following conditions result in a preferred wall contour in the tapered aperture. The axis of the first stream preferably rotates with respect to the axis of the bore. There is preferably also a second stream, the particle size of which is smaller than that of the first stream. The overall diameter of the second stream is smaller than that of the first stream, and the axis of the second stream is preferably directed on or near the axis of the bore. The first stream forms an elliptically-shaped tapered aperture, and the second stream reduces the angle at which the tapered aperture intersects the tube bore. Although the surface of the peripheral region of the tapered aperture may be relatively rough due to the large size of the particles of the first stream, the smaller sized particles of the second stream generate a smoother tapered aperture surface near the bore so that an optical fiber, which is inserted into the tapered aperture, easily slides into the bore.

The above-described tube is especially suitable for manufacturing optical energy transfer devices. To form an end-to-end connector, an optical fiber is inserted into each tapered aperture, the fiber endfaces meeting near the center of the bore. If the fibers include a protective coating, the coating is removed from that end of the fibers that extends into the bore so that the coating extends into the of the tapered aperture. Bonding material is applied to each optical fiber and to the adjacent tapered aperture to secure the fiber to the tube. That portion of the aperture surface that is formed by the larger-sized particles is sufficiently rough to cause the bonding material to tenaciously adhere thereto, thereby securely bonding the fiber to the tube.

Other types of couplers, including those based on the evanescent coupling of energy between side-by-side disposed fibers, can also be made from the above described tube. The methods of making such couplers also benefit from the above-described fiber insertion properties and fiber bonding properties.

BRIEF DESCRIPTION OF THE DRAWING

FIG. 1 is a schematic cross-sectional view of apparatus for forming in a capillary tube an enlarged, tapered aperture.

FIG. 2 is a side elevational view of a slotted insert for use in a tube support device.

FIG. 3 is a partial cross-sectional view of an elastomeric, capillary tube support device.

FIG. 4 is a schematic diagram illustrating the region of impingement onto a tube endface of a first stream of abrasive particulate material.

FIG. 5 is a partial cross-sectional view of a capillary tube illustrating the tapered surface resulting from the step illustrated in FIGS. 1 and 4.

FIG. 6 is partial cross-sectional view illustrating apparatus for modifying the tapered aperture formed by the step illustrated in FIG. 1.

FIG. 7 is a schematic diagram illustrating the region of impingement onto a tube endface of a second stream of abrasive particulate material.

DESCRIPTION OF THE PREFERRED EMBODIMENTS

Figure 8:
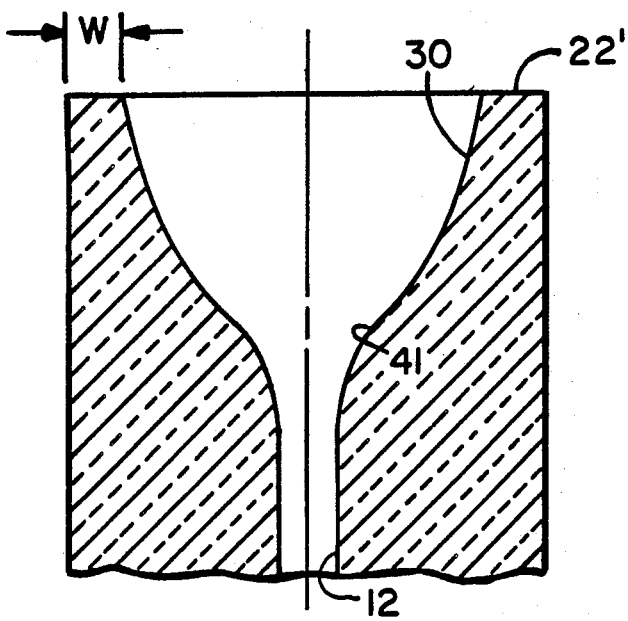
FIG. 8 is a partial cross-sectional view illustrating the tapered surface resulting from the step illustrated in FIGS. 6 and 7.

The drawings are not intended to indicate scale or relative proportions of the elements shown therein.

Referring to FIGS. 1 and 2, there is provided a cylindrical glass tube 10 having a longitudinal aperture or bore 12 extending between ends 18 and 20. For optical fiber connecting and coupling applications, tube 10 is preferably a precision capillary tube, i.e. it's bore diameter is controlled to tight tolerances. For certain applications, the bore cross-sectional shape is circular; for others, it may be shaped like a regular polygon, a diamond or the like. The bore may be provided with a longitudinal slot as taught in U.S. Pat. No. 4,763,970 to prevent a pistoning effect when fibers are inserted into opposite ends thereof.

The tube can be formed of any material in which a suitable aperture can be formed, provided the material is sufficiently brittle that minute pieces thereof can be removed by bombarding it with abrasive particles. The composition of tube 10 also depends on the particular kind of resultant device that is to be formed. Although glass is preferred for the end-to-end alignment of optical fibers, it is thought that other materials such as certain ceramics, metals and plastics could also be used. If the tube is to be formed of glass, for example, it could be a relatively hard glass such as pure silica or a softer glass such as $SiO_2$ doped with an oxide of lead, boron or the like. The refractive index of the capillary tube is immaterial for this type of connector. If the tube is to be used to form a side-to-side coupler of the type wherein two or more optical fibers are inserted into the bore and the tube is thereafter collapsed and stretched, the softening point temperature of tube 10 should be lower than that of the fibers that are to be inserted therein. Suitable tube compositions for this latter mentioned use are $SiO_2$ doped with 1 to 25 wt. % $B_2O_3$ and $SiO_2$ doped with 0.1 to approximately 2.5 wt. % fluorine. In addition to lowering the softening point temperature of $SiO_2$, $B_2O_3$ and F also advantageously decrease the refractive index thereof.

Tube 10 is mounted in a suitable apparatus such as that illustrated in FIGS. 2 and 3. The slotted insert of FIG. 2 comprises a cylindrical member 15 having an axial bore 16. Equally spaced about the circumference of insert 15 are three longitudinally-extending slots 17. Two slots 18 extend longitudinally along bore 16 in alignment with two of the slots 17. A third longitudinally-extending slot 19, which is aligned with the remaining outer slot 17, extends through bore 16 to the outer surface of member 15. Three elastomeric 0-rings, of which 0-rings 13 and 14 are shown in FIGS. 1 and 3, are inserted to bore 16 via slot 19. The remaining sides of the 0-rings are moved along the circumference of insert 15, one of them being positioned into each slot 17. The portions of the 0-rings opposite slots 17 are positioned in a respective slot 18 or 19. Tube 10 is inserted into the center of bore 16 where it is supported along the axis of insert 15 by the three equally-spaced 0-rings. Insert 15 is placed into the axial bore 29 of a rotatable disc 20, which is capable of rotating tube 10 about its axis 11 as indicated by arrow 21. For the sake of clarity and simplicity, only the 0-rings of the rotatable support apparatus are shown in FIG. 1, and no 0-rings are shown in FIG. 2.

Located adjacent end 22 and spaced a short distance therefrom is a nozzle 27 for directing thereon a stream 24 of particles of an abrasive material such as aluminum oxide, silicon carbide or the like. A suitable apparatus for supplying a stream of particles to nozzle 27 is an abrasive jet machining unit manufactured by S. S. White Industrial Products Division of Pennwalt Corporation, Piscataway, N.J., U.S.A. That unit includes a vibrator and mixing chamber which contains the particulate material. The output of the mixing chamber is connected by a pinch valve to the nozzle. A supply of air or inert gas is connected to the mixing chamber by a pressure regulator. The power supplied to the vibrator can be set to one of three levels to control the rate of flow of particles to the nozzle. Satisfactory results are been obtained when the vibrator power switch is placed in its medium position.

It is preferred that the region of end 22 that is intercepted by stream 24 is that which is indicated by dashed line 26 in FIG. 4. The axis of nozzle 27 (and also of stream 24) is indicated by numeral 25 in FIG. 1 and by the intersection of lines 25a and 25b in FIG. 4. In this preferred embodiment, axis 25 intersects end 22 at a point outside bore 12, and a portion of stream 24 impinges on a portion 22a of end 22 that is located on that side of bore 12 opposite axis 25.

The bombardment of end 22 by particulate stream 24 is continued until there is formed an enlarged tapered aperture 32 (FIG. 5). It is obvious that the same result could be achieved by holding tube 10 stationary while rotating stream axis 25 in a circular path. Various process parameters can be varied to change the time required to reach a predetermined depth and to change the shape of the tapered aperture. Such parameters are (a) the location of stream axis 25 with respect to axis 11, (b) the size and hardness of the abrasive particles, (c) gas velocity, which is related to gas pressure and nozzle size, (d) amount of particles in stream, (e) distance from nozzle tip to end 22, (e) size and shape of nozzle opening and (f) angle of nozzle axis 25 with respect to bore axis 11. Thus, for example, a tapered aperture similar to that obtained by the embodiment described in conjunction with FIGS. 1 and 4 might be formed by directing stream 24 onto axis 11 and changing one or more of the other above-listed parameters.

The tapered aperture can be formed in two or more particle bombardment steps. For example, the first step might employ relatively large particles to achieve fast material removal. If the first stream of particles is directed as described above, the resultant surface 32 may intersect bore 12 at an angle a that is larger than desired for fiber insertion purposes. When attempting to insert a fiber into bore 12, the angle of that portion of surface 32 adjacent bore 12 may prevent the fiber from smoothly sliding along that surface and into bore 12. The preferred embodiment of this invention therefore includes the step of directing a second stream 36 of abrasive particles from a second nozzle 38 onto the end of tube 10 as shown in FIG. 6. The axis of second stream 36, which is located at the intersection of broken lines 39a and 39b of FIG. 7, preferably intersects the end of the capillary tube at or within the circumference of bore 12. As shown in FIG. 6, axes 11 and 39 may be coaxial. As indicated by dashed line 40 of FIG. 7, the diameter of second stream 36 is smaller than that of first stream 24. Second stream 36 bombards and preferentially removes a portion of initially-formed tapered aperture 32 that is adjacent aperture 12, thereby forming gradually tapered aperture 41 of FIG. 8. Thus, rather than intersecting bore 12 at the relatively large angle a, the slope of gradually tapered aperture 41 now intersects bore 12 at an angle that is smaller than a. This smaller angle of intersection of the tapered aperture with capillary bore 12 greatly facilitates the insertion of a fiber into aperture 12.

The particles of second stream 36 are preferably of smaller diameter than those of first stream 24. In addition to removing that portion of surface 32 adjacent bore 12, the smaller particles of the second stream form a surface at the central portion of the tapered aperture that is less rough than the surface roughness that resulted from first stream 24, thereby further facilitating fiber insertion. Since that portion of the tapered aperture remote from bore 12 has a relatively rough surface, bonding material adheres well thereto.

One or more streams of abrasive particles can be directed onto the remaining end 23 of tube 10 subsequent to the process of directing streams onto end 22, thereby resulting in the formation of a completed splice tube.

Whereas the described embodiment employs two different streams of abrasive particulate material, three or more streams could also be utilized. For example, the second stream could have a smaller stream diameter than the first stream, but the particle size could be the same. A third stream of smaller sized particles could then be used to decrease the roughness the central portion of the tapered aperture. Other combinations of stream sizes and particle sizes could also be employed.

Forming a tapered aperture by the method of the present invention provides a fast, cost effective process that is easily automated for mass production. This method does not deform the outside diameter of the tube. It also allows the radial width w (FIG. 8) of the remaining annular portion 22' of the endface to be controlled to an extent sufficient to ensure that the resultant product possesses adequate strength. It is obvious that the resultant tube would be weakened if width w were so small that the tapered aperture ended in a sharp surface. Furthermore, the process of the present invention is insensitive to glass composition, thereby permitting the fabrication of tubes suitable for various types of couplers, connectors, splicers, end-to-end alignment devices and the like.

The present method can be employed as follows to make a splice tube in which 125 μm outside diameter optical fibers can be axially joined. A silica tube is collapsed onto a cylindrical carbon member having a longitudinal protrusion as taught in U.S. Pat. No. 4,750,926. The carbon member is burned out of the silica tube, which is thereafter drawn to reduce the diameter thereof. The resultant tube therefore has a longitudinal slot extending along the bore. If necessary, the outside diameter of the tube is increased by depositing glass particles on the outer surface of the tube and then heating the composite article to sinter or consolidate the particles. The resultant tube has an outside diameter of 2.5 mm and an axial bore diameter of 127 μm. The tube is scored at 2.54 cm intervals and then severed at each score line to produce individual tubes 10.

A tube 10 is mounted in the above-described support where it is rotated at 60 rpm. Spaced about 2.0 mm from end 22 of the tube is a nozzle 27 which is connected to the output of an abrasive jet machining unit to which to a supply of air is connected. The vibrator and mixing chamber contains 27 μm diameter aluminum oxide particles. The vibrator power switch is set at medium position whereby a medium particle flow rate is selected. The pressure regulator is adjusted to supply air to the mixing chamber at 40 psi. The inside diameter of the nozzle is 0.8 mm. The nozzle axis intersects the tube endface such that the edge of the particle stream is about 0.5 mm from the periphery of end 22. The pinch valve is opened to permit a stream of 27 μm aluminum oxide particles to emanate from the nozzle. This particulate stream is directed onto the tube endface for 5 seconds, thereby forming an enlarged tapered aperture 32 (FIG. 5) which is about 1.5 mm to 2 mm deep.

The first nozzle is replaced by a second nozzle 38, the axis of which is concentric with the tube aperture. The second nozzle, the inside diameter of which is 0.46 mm, is spaced 1 mm from the end of the tube. Nozzle 38 is connected to the output of an abrasive jet machining unit to which to a supply of nitrogen is connected. The type of gas to which the first and second abrasive jet machining units are connected is merely a matter of convenience. The vibrator and mixing chamber contains 10 μm diameter aluminum oxide particles. The vibrator power switch is set at medium position, and the pressure regulator is adjusted to supply nitrogen to the mixing chamber at 40 psi. The pinch valve is opened to permit a stream of 10 μm aluminum oxide particles to emanate from the nozzle. This particulate stream is directed onto the tube endface for 3 seconds, thereby forming an enlarged tapered aperture 46 (FIG. 8), the surface of which gradually conformed to bore 12. The central portion of the tapered aperture is much smoother than the outer region which had been formed by the larger diameter particles.

The tube is inverted longitudinally, and the above-described process is repeated.

Similar results could be achieved by practicing the method as described above except for adjusting the pressure regulators to supply the air and nitrogen to the abrasive jet machining units at pressures of 80 psi. The higher pressures enable the formation of a tapered aperture in a time that is shorter than that required when the gas pressures are regulated at 40 psi.

Figure 9:
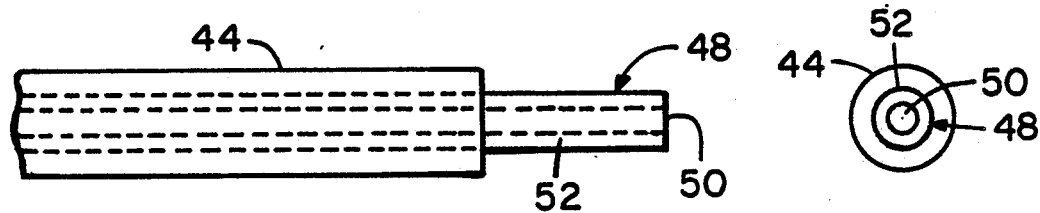
FIG. 9 is a front elevation of an optical fiber having a portion of the resin coating removed therefrom.
Figure 10:
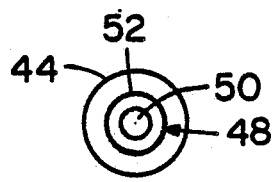
FIG. 10 is an end elevation of the fiber of FIG. 9.
Figure 11:
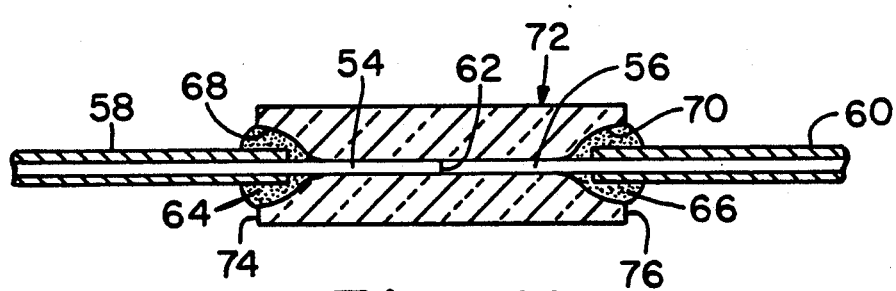
FIG. 11 is a cross-sectional view of a pair of fibers connected together by the splice tube of the present invention.

The resultant splice tube can be utilized as follows to connect in end-to-end alignment two optical fibers of the type shown in FIGS. 9 and 10. Each optical fiber 48 comprises a core 50 and a 125 μm outside diameter cladding 52 surrounded by protective coating 44. Using a stripping tool, about 38 mm of coating is removed from the ends of the fibers, and any remaining coating material is cleaned from the fibers. The uncoated ends of the fibers are square cut to a length of about 12 mm. A dab of adhesive is placed at one end of the splice tube; capillary action causes it to flow through the entire tube. As shown in FIG. 11, the uncoated cut end 54 of one fiber 58 is inserted into tapered aperture 68 and then into the bore of splice tube 72 so that its end is intermediate end surfaces 74 and 76. The relatively smooth region of the tapered aperture adjacent the tube bore facilitates the fiber insertion process. The uncoated cut end 56 of the second fiber 60 is inserted in the other tapered aperture 70 and into the longitudinal bore so that it is disposed with its end adjacent the end of fiber 54 as illustrated by numeral 62. With the fibers positioned as described, the coatings extend into the tapered apertures.

Quantities 64 and 66 of adhesive, which are then disposed in apertures 68 and 70, respectively, affix the coated fibers to splice tube 72 and retain the fiber endfaces adjacent one another. The relatively rough surfaces of the tapered apertures remote from the bore, which were formed by the first particle bombardment steps, provide good fiber-to-tube bonds.

Figure 12:
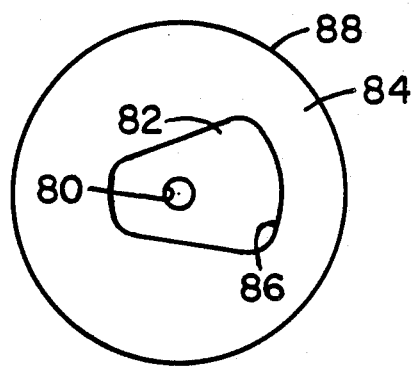
FIG. 12 is a schematic illustration of a device for supporting a nonsymmetrical tube.

FIG. 12 illustrates that the present method can be employed even when aperture 80 is not located at the center of capillary tube 82. The tube is illustrated as having a non-circular cross-section in this figure. To provide tube 82 with a tapered aperture that is coaxial with bore 80, the ends of tube 82 can be mounted in supports or discs 84 which have openings 86 shaped like the circumference of tube 82. The radial position of each opening 86 is such that outer surface 88 of support 84 is concentric with bore 80. To form tapered apertures, supports 84 can be mounted in a rotatable support apparatus of the type discussed in conjunction with FIG. 1, and the process of directing particulate material streams onto the end of tube 82 can be then carried out as described above.

I claim:

1. In a method of forming an optical energy transfer device comprising the steps of
   providing a tube having first and second opposite endfaces and a bore which extends longitudinally therethrough, said bore having a longitudinal axis, said tube being formed of brittle material,
   forming at the first endface of said tube an enlarged tapered aperture;
   inserting into said tapered aperture at least one optical fiber, and
   applying bonding material to said optical fiber and to said tapered aperture to secure said fiber to said tube,
said method being characterized in that the step of forming comprises
   directing a first stream of abrasive particles toward said tube endface, said stream contacting less than the entirety of said first endface, said stream contacting said first endface such that one edge of said stream extends further from the axis of said bore than the edge of said stream opposite said one edge, and rotating said tube about said longitudinal axis, in the vicinity of the intersection of said aperture with said first endface, the step of directing being continued for a sufficient length of time to enlarge that portion of said bore that intersects said first endface.

2. A method in accordance with claim 1 wherein said first stream has an axis which rotates with respect to the axis of said bore.

3. A method in accordance with claim 2 further comprising the step of directing toward said first endface a second stream of abrasive particles, said first and second streams have longitudinal axes, the cross-sections of each of said first and second streams in a plane perpendicular to the longitudinal axes thereof being circular, whereby said first and second streams have diameters, the diameter of said first stream being greater than that of said second stream.

4. A method in accordance with claim 3 wherein the step of directing toward said first endface a second stream of abrasive particles comprises directing toward said first endface a stream, the axis of which is substantially coaxial with said bore, the size of said abrasive particles of said second stream being smaller than the size of said abrasive particles of said first stream, whereby the relatively rough peripheral region of said tapered aperture formed by said first stream adheres well to said bonding material, and the relatively smooth region of said tapered aperture adjacent said bore facilitates the insertion of said at least one optical fiber into said bore.

5. A method of forming a tapered aperture at the end of a capillary tube bore comprising the steps of
   providing a capillary tube having first and second opposite endfaces and a bore which extends longitudinally therethrough, said bore having a longitudinal axis,
   directing a stream of abrasive particles toward said first tube endface in the vicinity of the intersection of said bore with said first endface, said stream contacting less than the entirety of said first endface, said stream contacting said first endface such that one edge of said stream extends further rom the axis of said bore than the edge of said stream opposite said one edge, and rotating said tube about said longitudinal axis, the step of directing being continued for a sufficient length of time to enlarge that portion of said bore that intersects that first endface.

6. A method in accordance with claim 1 wherein the step of directing a stream comprises directing toward said first endface a first stream of abrasive particles having a given diameter and thereafter, directing toward said first end and a second stream of abrasive particles having a diameter that is smaller than said given diameter.

7. A method in accordance with claim 2 wherein said first and second streams have longitudinal axes and the cross-sections of each of said first and second streams in a plane perpendicular to the longitudinal axes thereof is circular, whereby said first and second streams have diameters, the diameter of said first stream being greater than that of said second stream.

8. A method in accordance with claim 7 wherein the step of directing toward said first endface a second stream of abrasive particles comprises directing toward said first endface a stream, the longitudinal axis of which is substantially coaxial with the longitudinal axis of said bore.

9. A method in accordance with claim 7 wherein the step of directing toward said first endface a second stream of abrasive particles comprises directing toward said first endface a stream, the longitudinal axis of which is substantially coaxial with said bore.

10. A method of forming a tapered aperture at the end of a capability tube bore comprising the steps of providing a capillary tube having first and second opposite endfaces and a bore which extends longitudinally therethrough, said tube being formed of brittle material and having a longitudinal axis, rotating said tube about the axis of said bore, and directing toward said first endface first and second streams of abrasive particles, said first and second streams having longitudinal axes and the cross-sections of each of said first and second streams in a plane perpendicular to the longitudinal axes thereof being circular, whereby said first and second streams have diameters, said first stream of abrasive particles having a given diameter, said first stream having an axis that is non-coaxial with respect to said bore axis, the step of directing being continued for a sufficient length of time to enlarge that portion of said bore that intersects said first endface, said second stream of abrasive particles having an average diameter that is smaller than said given diameter.

11. A method in accordance with claim 10 wherein the diameter of said first stream is greater than that of said second stream.

12. A method in accordance with claim 11 wherein the step of directing toward said first endface a second stream of abrasive particles comprises directing toward said first endface a stream, the axis of which is substantially coaxial with said bore.

13. A method in accordance with claim 10 wherein the step of directing toward said first endface a second stream of abrasive particles comprises directing toward said first endface a stream, the axis of which is coaxial with said bore.

* * * * *